W. HUEY.
Machine for Sawing Shingles.
No. 160,524. Patented March 9, 1875.
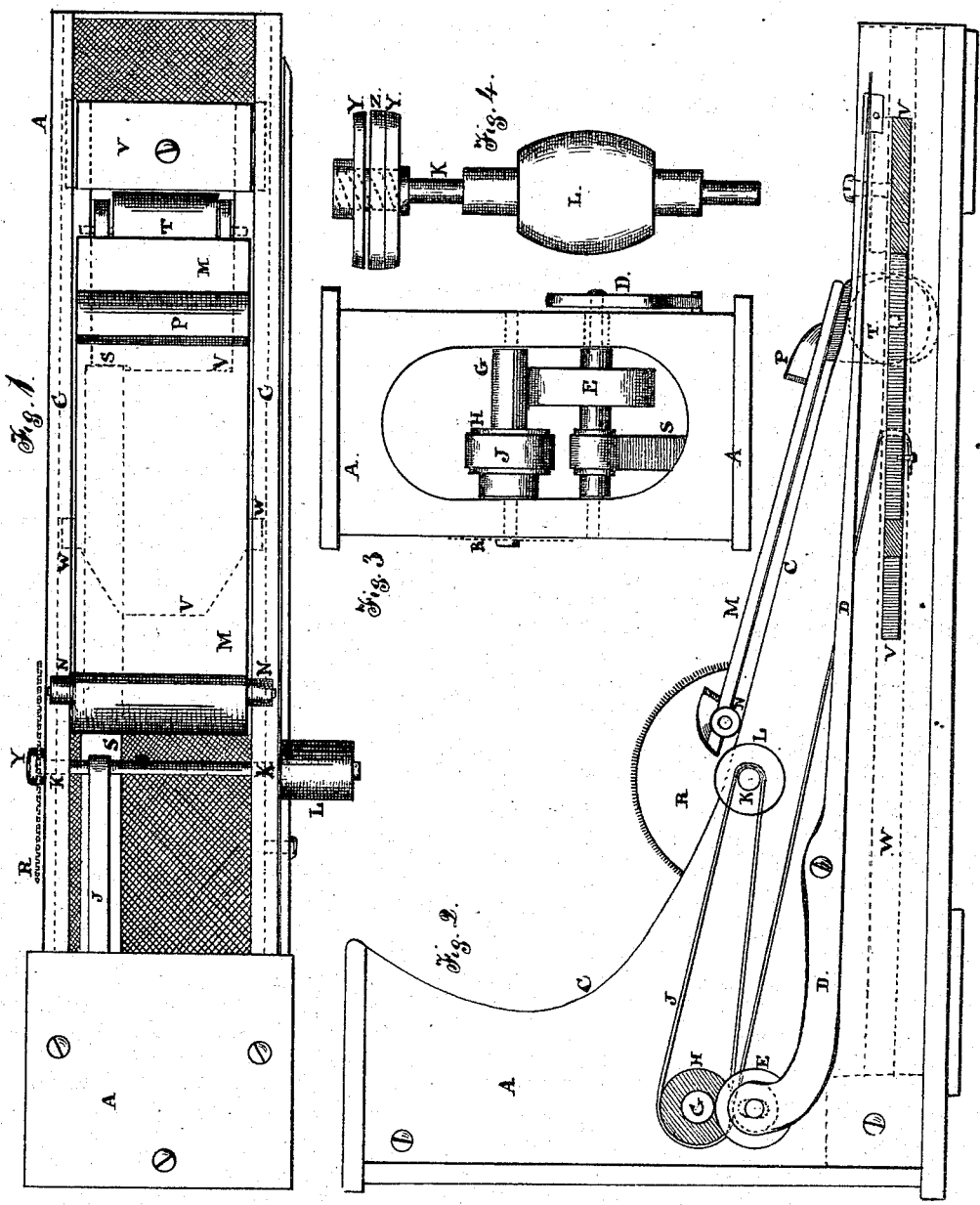

UNITED STATES PATENT OFFICE.

WILLIAM HUEY, OF SALISBURY, MARYLAND.

IMPROVEMENT IN MACHINES FOR SAWING SHINGLES.

Specification forming part of Letters Patent No. 160,524, dated March 9, 1875; application filed January 25, 1873.

*To all whom it may concern:*

Be it known that I, WILLIAM HUEY, of Salisbury, Wicomico county, State of Maryland, have invented Improvements in Machines for Sawing Shingles and other timber; and I do hereby declare the following to be an exact description thereof, reference being had to the accompanying drawings and to the letters of reference marked thereon, making a part of this specification, in which—

Figure 1 represents a top view of the machine; Fig. 2, a side elevation of the same; Fig. 3, a rear view of the same, and Fig. 4 shows the band-pulley and mandrel.

The nature of my invention consists in the arrangement and combination of the carriage, horizontal sliding frame, and elliptic railway, and the adjustable mandrel.

The object and advantage of my invention are, that the saw cuts with greater ease and facility as the bolt moves toward the saw, making the cut rounding off the corners instead of a long straight cut, and the carriage all the time passing the saw in a circular or elliptic direction, keeping also the same distance from the mandrel, the upper end of the carriage moving on the railway on the top edges or sides of the frame of the machine, inclining elliptically upward, while the lower end moves backward and forward on a horizontal plane, the carriage having an incline circular and horizontal motion during the sawing operation.

A represents the frame of the machine, having on its upper sides an incline and elliptic curved railway, C C, and on the one side a long lever, D, for the purpose of throwing the rear friction-wheel E in or out of gear with the upper roller or cylinder G, upon which the band-pulley H operates, that is connected by the belt J to the saw shaft or axle K, that has the main driving band-pulley L on its outer end on the outside of the frame A. M is the traveling incline carriage, with its rollers N in front running upon the railway C C.

The bolt or shingle to be sawed is laid upon the carriage in front of the rest P and is carried forward to the saw R, as the carriage or platform is drawn forward by the windlass or winding-belt S, and when the bolt is sawed through and the carriage has reached its terminus up the incline C, the lever D is raised, by which the friction-wheel E is lowered, and the belt S unwinds, and the carriage M slides by its own weight and gravity down and back to its place. The lower end of the carriage M is attached to the axle of the traveling-roller T, and the journals of the axle of this roller T are permanently set in a horizontal sliding frame, V, that moves forward and backward in the grooves W W in the sides of the frame A, and this sliding frame V is drawn forward by the winding strap or belt S, while the lower end of the carriage M moves horizontally backward and forward with the sliding frame V.

The flanges of the saw-mandrel Y may be made of cast-iron, and these flanges or collars are filled in between with brass or any soft metal Z, so that the metal Z can be turned off at any time when required to be made perfectly true for the correct position of the saw, even when the mandrel Y is operating in the machine, and can always be made true in its usual place of running without detaching the mandrel from the machine.

What I claim as my invention, and desire to secure by Letters Patent, is—

The carriage M, moving upon a track which forms a portion of an ellipse, in combination with the horizontally-moving frame V, as and for the purpose specified.

WILLIAM HUEY.

Attest:
   D. E. FOOKS,
   HANDY FOOKS.